(12) United States Patent
Leguen et al.

(10) Patent No.: US 8,336,192 B2
(45) Date of Patent: Dec. 25, 2012

(54) METHOD OF COLLECTIVE FABRICATION OF CALIBRATION-FREE TEMPERATURE AND/OR STRAIN SENSORS BY MATCHING OF RESONATORS ON THE BASIS OF RESONANT FREQUENCY AND STATIC CAPACITANCE CRITERIA (75) Inventors: Jean-François Leguen, Nice (FR); Luc Chommeloux, Le Cannet (FR)

(73) Assignee: Senseor, Mougins (FR)

( * ) Notice: Subject to any disclaimer, the term of this patent is extended or adjusted under 35 U.S.C. 154(b) by 237 days.

(21) Appl. No.: 12/820,014

(22) Filed: Jun. 21, 2010

(65) Prior Publication Data

US 2010/0319184 A1   Dec. 23, 2010

(30) Foreign Application Priority Data

Jun. 19, 2009   (FR) ...................... 09 02993

(51) Int. Cl.
    *G01R 3/00* (2006.01)
(52) U.S. Cl. .......... 29/595; 29/25.35; 29/592.1; 29/594; 29/609.1; 73/514.16; 73/514.29; 73/514.34; 310/313 B; 310/313 R; 310/329; 310/359; 333/193; 333/194; 333/195
(58) Field of Classification Search .................. 29/25.35, 29/592.1, 594, 595, 609.1, 844, 852, 882; 310/313 B, 313 R, 329, 358, 359; 333/193–195; 73/514.16, 514.29, 514.34
See application file for complete search history.

(56) References Cited

U.S. PATENT DOCUMENTS

| 5,786,303 | A  | * | 7/1998  | Mansour ...................... 505/210 |
| 6,556,419 | B2 | * | 4/2003  | Suzuki et al. ................. 361/303 |
| 6,786,095 | B2 | * | 9/2004  | Tabota ....................... 73/514.29 |
| 7,116,186 | B2 | * | 10/2006 | Chen ............................ 333/126 |
| 7,134,339 | B2 | * | 11/2006 | Mikado et al. ............. 73/514.29 |
| 7,194,906 | B2 | * | 3/2007  | Mikado et al. ............. 73/514.34 |
| 7,353,707 | B2 | * | 4/2008  | Mikado et al. ............. 73/514.34 |
| 7,379,629 | B1 | * | 5/2008  | Burns ............................. 385/12 |
| 2007/0063622 | A1 | * | 3/2007 | Rudy ........................... 310/341 |

FOREIGN PATENT DOCUMENTS

| FR | 2 907 284 A1 | 4/2008 |
| FR | 2 922 305 A1 | 4/2009 |
| WO | 2008/046850 A1 | 4/2008 |

* cited by examiner

*Primary Examiner* — Paul D Kim
(74) *Attorney, Agent, or Firm* — Baker & Hostetler LLP (57) ABSTRACT

A method of collective fabrication of remotely interrogatable sensors, wherein the method may include fabricating fabricating a first series of first resonators exhibiting a first resonant frequency at ambient temperature and a first static capacitance and fabricating a second series of second resonators exhibiting a second resonant frequency at ambient temperature and a second static capacitance. The method may also include performing a series of electrical measurements of the set of the first series of first resonators and of the set of the second series of second resonators, so as to determine first pairs and second pairs of resonant frequency and of capacitance of each of the first and second resonators and performing a series of matching of a first resonator and of a second resonator.

14 Claims, 6 Drawing Sheets

METHOD OF COLLECTIVE FABRICATION OF CALIBRATION-FREE TEMPERATURE AND/OR STRAIN SENSORS BY MATCHING OF RESONATORS ON THE BASIS OF RESONANT FREQUENCY AND STATIC CAPACITANCE CRITERIA

CROSS-REFERENCE TO RELATED APPLICATIONS

This application claims priority to foreign Patent Application FR 09 02993, filed on Jun. 19, 2009, the disclosure of which is incorporated herein by reference in its entirety.

FIELD OF THE INVENTION

The field of the invention is that of passive surface acoustic wave sensors, also known as "SAW" sensors, making it possible to perform for example measurements of temperature and/or of pressure/stresses remotely, and more precisely that of the collective fabrication of such sensors.

BACKGROUND OF THE INVENTION

One type of temperature sensor can typically consist of two SAW resonators denoted $R_1$ and $R_2$ and undertake differential measurements. For this purpose the two resonators are designed to have different resonant frequencies.

Typically, each resonator is composed of a transducer with inter-digitated combs, consisting of an alternation of electrodes, which are repeated with a certain periodicity called the metallization period, deposited on a piezoelectric substrate that may advantageously be quartz. The electrodes, advantageously aluminium or aluminium alloy (produced by a photolithography method), exhibit a low thickness relative to the metallization period (typically, a few hundred nanometers to a few micrometers). For example for a sensor operating at 433 MHz, the metal (aluminium for example) thickness used can be of the order of 100 to 300 nanometers, the metallization period and the electrode width possibly being respectively of the order of 3.5 µm and 2.5 µm.

One of the ports of the transducer is for example linked to the live point of a Radio Frequency (RF) antenna and the other to earth or else the two ports are linked to the antenna if the latter is symmetric (dipole for example). The field lines thus created between two electrodes of different polarities give rise to surface acoustic waves in the zone of overlap of the electrodes.

The transducer is a bi-directional structure, that is to say the energy radiated towards the right and the energy radiated towards the left have the same intensity. By arranging electrodes on either side of the transducer, the said electrodes playing the role of reflector, a resonator is produced, each reflector partially reflecting the energy emitted by the transducer.

If the number of reflectors is multiplied, a resonant cavity is created, characterized by a certain resonant frequency. This frequency depends firstly on the speed of propagation of the waves under the network, the said speed depending mainly on the physical state of the substrate, and therefore sensitive for example to temperature. In this case, this is the parameter which is measured by the interrogation system and it is on the basis of this measurement that a temperature can be calculated.

It is recalled that the variation of the resonant frequency as a function of temperature of a quartz resonator is determined by the following formula:

$$f(T)=f_0[1+CTF_1(T-T_0)+CTF_2(T-T_0)^2]$$

With $f_0$ the frequency at $T_0$, $T_0$ being the reference temperature (25° C. by convention), $CTF_1$ the first-order coefficient (ppm/° C.) and $CTF_2$ the second-order coefficient (ppb/° C.$^2$).

The two resonators can use different wave propagation directions, produced though an inclination of the different inter-digitated electrode combs on one and the same substrate, for example quartz.

The two resonators can also advantageously use different quartz cuts making it possible to endow them with different resonant frequencies, in this instance for the resonator $R_1$ the quartz cut (YX1)/$\theta_1$ and for the resonator $R_2$: the cut (YX1)/$\theta_2$ with reference to the IEEE standard explained hereinafter, the two resonators using propagation which is collinear with the crystallographic axis X.

Whatever solution is adopted for creating different resonant frequencies, the fact of using a differential structure presents several advantages. The first is that the frequency difference of the resonators is almost linear as a function of temperature and the residual non-linearities taken into account by the calibration of the sensor. Another advantage of the differential structure resides in the fact that it is possible to sidestep the major part of the ageing effects.

It is recalled that the expression "calibration operation" denotes the determination of so-called calibration parameters $A_0$, $A_1$ and $A_2$ of the following function:

$$T=A_0\pm\sqrt{A_1+A_2\Delta f}$$

When these parameters are defined, a differential measurement of frequency then makes it possible to determine a temperature.

Generally, resonators are produced collectively on wafers 100 mm in diameter, typically this might involve fabricating about 1000 specimens on one and the same wafer. This therefore gives 1000 specimens of resonators $R_1$ and 1000 specimens of resonators $R_2$, each temperature sensor comprising a pair of resonators $R_1$ and $R_2$.

The calibration operation is nonetheless expensive in terms of time since it makes it necessary to measure for each sensor the frequency difference between the two resonators at three different temperatures at the minimum and moreover requires the serialization of each sensor (corresponding to the identification of a sensor—calibration coefficients pair for each sensor).

It is for example possible to envisage storing the calibration coefficients $A_0$, $A_1$, $A_2$ in the interrogation system. This configuration requires, in the event of a change of sensor, that the new coefficients be stored in the interrogation system.

One of the aims sought in the present invention is to produce a calibration-free temperature sensor while retaining good precision in the temperature measurement.

For this purpose it is necessary to control on the one hand the dispersion in the difference in resonant frequencies of the resonators $R_1$ and $R_2$, and on the other hand the dispersion in the coefficients $CTF_1$ and $CTF_2$ (first-order and second-order temperature coefficients), or at least the difference in these coefficients $CTF_1$ and $CTF_2$ when a differential measurement is carried out, as is demonstrated hereinafter and by virtue of the following various reminders:

1) Concerning Crystalline Orientation

In order to define the crystalline orientations, the IEEE standard is used. This designation uses the following 2 reference frames:

the crystallographic reference frame (X, Y, Z).

the working reference frame (w, l, t) defined by the surface of the substrate (normal to $\vec{t}$) and the direction of propagation of the surface waves (axis $\vec{l}$).

The designation of a cut is of the type (YX wlt)/ϕ/θ/ψ with:
YX two crystalline axes making it possible to place the working reference frame with respect to the crystallographic reference frame before any rotation. The first axis is along the axis t, normal to the surface whereas the second is along the axis l. The third axis of the working reference frame w is given by the sense of the right-handed trihedron (w, l, t).

w, l, t indicates a series of axes around which it is possible to perform successive rotations by respective angles ϕ, θ, ψ. In the subsequent description, the variables ϕ, θ, ψ are associated with rotations around the respective axes w, l, t.

Figure 1:
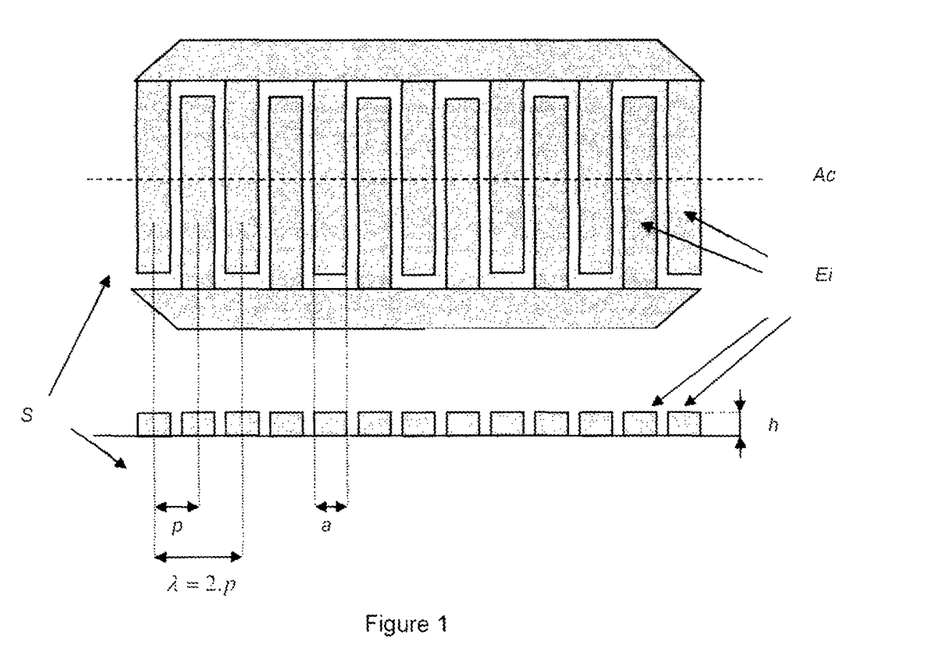
FIG. 1 illustrates a resonator structure according to an embodiment of the present invention.

2) Concerning the Geometry of the Saw Resonator:

The dimensions characterizing a surface wave device consisting of inter-digitated electrode combs Ei, which are symmetric with respect to an axis Ac and deposited on the surface of a piezoelectric substrate are denoted in the following manner and illustrated in FIG. 1:

the metallization period denoted: "p";
the wavelength denoted: "λ", with λ=2·p;
the electrode width denoted: "a";
the metallization thickness denoted "h".

In general, to sidestep the operating frequency of the device, the following normalized variables are actually used:

the metallization ratio a/p, ratio of electrode width to the metallization period;
the normalized metallization thickness h/λ ratio of the metallization thickness to the wavelength λ=2·p.

3) Concerning the Laws of Variations with Temperature of 2 Surface Wave Resonators:

As defined previously it is possible to express the frequency behaviours of the two resonators respectively by the following equations:

$$\text{For the resonator } R_1: f_1(T) = f_{01} \cdot (1 + C_{11} \cdot (T - T_0) + C_{21} \cdot (T - T_0)^2) \quad (1)$$

With: $f_1(T)$ the resonant frequency of $R_1$ as a function of temperature
$f_{01}$ the resonant frequency of $R_1$ at the temperature $T_0$ (generally 25° C.);
$C_{11}$ the $1^{st}$-order temperature coefficient (generally called CTF1) of $R_1$;
$C_{21}$ the $2^{nd}$-order temperature coefficient (generally called CTF2) of $R_1$;

$$\text{For the resonator } R_2: f_2(T) = f_{02} \cdot (1 + C_{12} \cdot (T - T_0) + C_{22} \cdot (T - T_0)^2) \quad (2)$$

With: $f_2(T)$ the resonant frequency of $R_2$ as a function of temperature
$f_{02}$ the resonant frequency of $R_2$ at the temperature $T_0$ (generally 25° C.);
$C_{12}$ the $1^{st}$-order temperature coefficient (generally called CTF1) of $R_2$;
$C_{22}$ the $2^{nd}$-order temperature coefficient (generally called CTF2) of $R_2$;

In the general case, the resonant frequency at 25° C. and the $1^{st}$-order and $2^{nd}$-order temperature coefficients depend mainly:

on the chosen crystalline orientation;
on the metallization period of "p" for $f_0$ alone;
on the normalized metallization thickness h/λ;
on the metallization ratio a/p.

And generally, the frequency difference is a function of temperature which can therefore be expressed in the following manner:

$$\Delta f(T) = f_2(T) - f_1(T) \quad (3)$$

$$= f_{02} - f_{01} + \left(\frac{C_{12} \cdot f_{02} -}{C_{11} \cdot f_{01}}\right) \cdot (T - T_0) +$$

$$\left(\frac{C_{22} \cdot f_{02} -}{C_{21} \cdot f_{01}}\right) \cdot (T - T_0)^2$$

$$= \Delta_0 + s \cdot (T - T_0) + \varepsilon \cdot (T - T_0)^2$$

With: $\Delta_0 = f_{02} - f_{01}$ the difference in resonant frequency at the temperature $T_0$;
$s = C_{12} \cdot f_{02} - C_{11} \cdot f_{01}$ the $1^{st}$-order differential coefficient
$\varepsilon = C_{22} \cdot f_{02} - C_{21} \cdot f_{01}$ the $2^{nd}$-order differential coefficient The calibration coefficients make it possible on the basis of a measurement of the frequency difference to get back to the temperature information. It can be shown that:

$$T = T_0 + \frac{-s \pm \sqrt{s^2 - 4\varepsilon(\Delta_0 - \Delta f)}}{2\varepsilon} = A_0 \pm \sqrt{A_1 + A_2 \Delta f} \quad (4)$$

Where $A_0$, $A_1$ and $A_2$ are the calibration coefficients as explained in the preamble of the present description.

4) Concerning Manufacturing Dispersions:

The methods of fabrication of resonators being controlled with a certain precision, the crystalline orientation (ϕ, θ, ψ) and the geometry of the resonator (related to the parameters a and h alone, in effect it is considered that the metallization period p is perfectly controlled) are never, in practice, exactly those aimed at and moreover they are not perfectly reproducible.

For a sufficiently large sample, these parameters follow Gaussian distributions (law of large numbers) whose means and standard deviations can be determined experimentally. The whole set of variations of the five parameters ϕ, θ, ψ, a and h is called manufacturing dispersions.

The parameters $f_0$, $C_{11}$, $C_{12}$ and $C_{21}$, $C_{22}$ being dependent on ϕ, θ, ψ, a and h, can also be controlled with a certain precision and can follow distributions centred around a mean with a certain standard deviation.

The applicant has started from the assumption that there were three predominant parameters in terms of manufacturing dispersions with respect to the set of five parameters $f_0$, $C_{11}$, $C_{12}$ and $C_{21}$, $C_{22}$.

The three predominant parameters in the manufacturing dispersions are the following:

the dispersion in the angle of cut θ which corresponds in IEEE notation to the cut (YX1)/θ;
the dispersion in the metallization thickness a;
the dispersion in the electrode width h.

Indeed, the cuts of the substrates are chosen such that they comply with the criteria: ϕ=0 and ψ=0 thereby corresponding to the crystalline orientation (YXwlt)/ϕ=0/ψ=0 in IEEE notation.

Now, the points ϕ=0 and ψ=0 correspond to points at which all the derivatives with respect to ϕ and ψ vanish. The variations of the following parameters taken into account ($f_0$, $C_1$, $C_2$) can be considered zero around these points:

$$\left.\frac{\partial f_0}{\partial \varphi}\right|_{\varphi=0} = 0 \quad (5)$$

$$\left.\frac{\partial C_1}{\partial \varphi}\right|_{\varphi=0} = 0$$

$$\left.\frac{\partial C_2}{\partial \varphi}\right|_{\varphi=0} = 0$$

$$\left.\frac{\partial f_0}{\partial \psi}\right|_{\psi=0} = 0$$

$$\left.\frac{\partial C_1}{\partial \psi}\right|_{\psi=0} = 0$$

$$\left.\frac{\partial C_2}{\partial \psi}\right|_{\psi=0} = 0$$

Typically and by way of example, the following dispersions in these 3 parameters can be considered:
 a dispersion in electrode width: $\Delta a = +/-0.06$ μm;
 a dispersion in metallization thickness: $\Delta h = +/-30$ Ångströms;
 a dispersion in angle of cut: $\Delta\theta = +/-0.05°$.

Assuming the 3 parameters follow Gaussian distributions, $+/-3$ times the standard deviation of the relevant parameter is called the dispersion:

$\Delta a = +/-3 \cdot \sigma(a)$
$\Delta h = +/-3 \cdot \sigma(h)$
$\Delta\theta = +/-3 \cdot \sigma(\theta)$ With $\sigma(a)$, $\sigma(h)$, $\sigma(\theta)$ respectively the standard deviations of the electrode width a, of the metallization thickness h and of the angle of cut $\theta$.

Note that for a Gaussian distribution with mean μ and standard deviation σ, 99.74% of the most probable population is in the interval $[\mu-3\cdot\sigma, \mu+3\cdot\sigma]$:

$$P(\mu-3\cdot\sigma < X < \mu+3\cdot\sigma) = 0.9974 \quad (6)$$

In the subsequent description, the expression "nominal value" refers to the values of the parameter a, h or θ aimed at during fabrication and called hereinafter: $a_{nom}$, $h_{nom}$, $\theta_{nom}$.

Moreover, for each of the 3 parameters, the following cases are considered:

$$a_{min} = a_{nom} - \Delta a \quad a_{max} = a_{nom} + \Delta a$$

$$h_{min} = h_{nom} - \Delta h \quad h_{max} = h_{nom} + \Delta h$$

$$\theta_{min} = \theta_{nom} - \Delta\theta \quad \theta_{max} = \theta_{nom} + \Delta\theta \quad (7)$$

5) Concerning the Sensor Calibration Operation:

The parameters $f_0$, $C_1$, $C_2$ controlled with a certain precision, are distributed according to a distribution centred around a mean with a certain standard deviation. The laws of variations with temperature of the resonators are therefore not identical for all the sensors and the same holds for the calibration coefficients.

To obtain maximum precision of temperature measurement, the calibration coefficients must therefore be calculated individually for each sensor. For this purpose, it is necessary to measure $\Delta f(T)$ over the whole of the temperature span where the sensor is used so as to fit the coefficients $A_0$, s, $\epsilon$ and ultimately calculate $A_0$, $A_1$ and $A_2$.

This operation is very lengthy and hardly compatible with high-volume production, one seeks therefore to sidestep it.

Among the solutions that may be conceived for accomplishing collective fabrication of calibration-free SAW sensors it is conceivable to use a suite of common calibration coefficients for a set of sensors while maintaining acceptable measurement precision. Moreover, a limited number of sensors can be measured temperature-wise (representative sample) making it possible to determine a mean calibration coefficients suite used for the whole set of sensors. It is then advisable that a suite of calibration coefficients should be common to the largest possible number of sensors, the ideal even being that a suite of coefficients should be common to all the sensors of a given type (defined by the crystalline orientation and the geometry of each of the 2 resonators). This therefore produces what is called a "calibration-free sensor".

Generally, by considering the law of differential variations with temperature, given by expression (3), it is seen that it is necessary to reduce the dispersions in $A_0$, s and $\epsilon$, if one wishes to have a suite of common calibration coefficients for all the sensors, while having good precision of frequency measurement.

One solution is to reduce the dispersions in $f_{01}$, $C_{11}$, $C_{21}$, $f_{02}$, $C_{12}$ and $C_{22}$. This leads to carrying out a sorting operation on each of the 3 parameters of the two resonators. This approach is, however, not that adopted in the present invention for the following reasons:
 one of the objectives is to not measure the sensors temperature-wise individually, therefore the values of $C_{11}$, $C_{21}$, $C_{12}$ and $C_{22}$ are not known for each sensor.
 moreover, calculations have shown that a sorting operation such as presented reduces the yields too much if acceptable measurement precision is desired.

SUMMARY OF THE INVENTION

In this context and to solve the aforementioned problems, the present invention relates to a novel method of collective fabrication of calibration-free sensors making it possible to retain acceptable measurement precision.

More precisely, one embodiment of the present invention provides a method of collective fabrication of remotely interrogatable sensors, each sensor comprising at least one first resonator and one second resonator, each resonator comprising acoustic wave transducers designed such that they exhibit respectively a first and a second operating frequency, in which the method comprises:
  the fabrication of a first series of first resonators $RT_{1i}$ exhibiting a first resonant frequency at ambient temperature $f_{1i}$ and a first static capacitance $C_{1i}$;
  the fabrication of a second series of second resonators $RT_{2j}$ exhibiting a second resonant frequency at ambient temperature $f_2$ and a second static capacitance $C_{2j}$;
  a series of electrical measurements of the set of the first series of first resonators and of the set of the second series of second resonators, so as to determine first pairs $(f_{1i}, C_{1i})$ and second pairs $(f_{2j}, C_{2j})$ of resonant frequency and of static capacitance of each of the first and second resonators; and
  a series of matchings of a first resonator $RT_{1i}$ and of a second resonator $RT_{2j}$ according to the aggregate of the following two criteria: the dispersion in the difference in resonant frequency $(f_{1i}-f_{2j})$ is less than a first threshold value (Sf) and the dispersion in the difference in static capacitance $(C_{1i}-C_{2j})$ is less than a second threshold value of (Sc).

According to a variant of the invention, the electrical measurements are performed by determining measurements of the reflection coefficient S11 or measurements of admittance Y11 or else measurements of impedance Z11.

According to a variant of the invention the electrical measurements are performed with a network analyzer.

According to a variant of the invention, the measurements of static capacitance are carried out with a high-precision capacimeter.

According to a variant of the invention, the first and second resonant frequencies are similar and situated in the ISM frequency span (433.05 MHz, 434.79 MHz), the threshold value Sf being less than or equal to about a few kHz and/or the threshold value Sc being less than or of the order of a femto-Farad.

According to a variant of the invention, the method comprises for each first resonator of the first series, the selection of a second resonator of the second series so as to satisfy the two matching criteria.

According to a variant of the invention, the method comprises the fabrication of first resonators on a first substrate and the fabrication of second resonators on a second substrate.

According to a variant of the invention, the resonators are produced on quartz substrates of different cuts.

According to a variant of the invention, the first and second substrates are defined by angles of cut θ according to the IEEE standard (YX1)/θ, of 24° and 34° so as to generate resonators of frequency 433 MHz and 434 MHz.

According to a variant of the invention, the method further comprises:
- the fabrication of first resonators ($RT_{1i}$) on a first substrate (S1) and the fabrication of second resonators ($RT_{i2}$) on a second substrate (S2);
- unit slicings of first and of second chips comprising respectively the first and second resonators from the said substrates;
- the matching of a first and of a second chip;
- the assembling of the pairs of chips in a package.

According to a variant of the invention, the method further comprises:
- the fabrication of first resonators on a first substrate and the fabrication of second resonators on a second substrate;
- unit slicings of first and of second chips comprising respectively the first and second resonators from the said substrates;
- the individual packaging of the first chips and of the second chips in individual packages;
- the matching of a first and of a second previously packaged chip.

According to a variant of the invention, the sensor is a temperature sensor.

According to a variant of the invention, the first resonators are oriented on the first substrate in a first direction, the second resonators are oriented on the second substrate in a second direction, the said directions corresponding to the directions of propagation of the surface waves, and in such a way that the first direction makes a non-zero angle with the second direction.

BRIEF DESCRIPTION OF THE DRAWINGS

The invention will be better understood and other advantages will become apparent on reading the description which follows given by way of non-limiting example and by virtue of the appended figures among which.

DETAILED DESCRIPTION

A method of collective fabrication of remotely interrogatable passive acoustic wave sensors advantageously produces at least two resonators, arising from the fabrication of two series of resonators, matched pairwise.

Various embodiments of the present invention are described hereinafter within the framework of two resonators exhibiting similar resonant frequencies, typically this is the case with a frequency $f_{01}$~433.6 MHz and a frequency $f_{02}$~434.4 MHz.

The resonators R1 can be produced on the surface of an (XY1)/24 quartz cut and the resonators R2 can be produced on the surface of an (XY1)/34 quartz cut.

Nonetheless, the invention could be implemented with other cuts.

The applicant has started from the finding that it was possible to effect the following approximation: $f_{02} \approx f_{01}$ and $df_{02} \approx df_{01}$.

Typically this approximation can be made when $(f_{02}-f_{01})/f_{01} \ll 1$, this is typically the case when there are two orders of magnitude of difference.

By way of example with a frequency $f_{01}$~433.6 MHz and a frequency $f_{02}$~434.4 MHz and $3 \cdot \sigma(f_{02}) \approx 3 \cdot \sigma(f_{01}) = 110$ kHz, the approximation is acceptable.

The differential coefficients then become:

$$s = C_{12} \cdot f_{02} - C_{11} \cdot f_{01} \approx f_{01} \cdot (C_{12} - C_{11})$$

$$\epsilon = C_{22} \cdot f_{02} - C_{21} \cdot f_{01} \approx f_{01} \cdot (C_{22} - C_{21})$$

And the dispersions corresponding to the partial derivatives can be written:

$$ds = df_{01} \cdot (C_{12} - C_{11}) + f_{01} \cdot d(C_{12} - C_{11})$$

$$d\epsilon = df_{01} \cdot (C_{22} - C_{21}) + (C_{22} - C_{21})$$

By way of example let us consider that the resonator $R_1$ uses the quartz cut (YX1)/24 and the resonator $R_2$ the cut (YX1)/34. These two resonators can potentially be used for a differential measurement of the temperature in a span of [−20, 160]° C. and using the ISM band [433.05, 434.79] MHz.

Under these conditions we have:
$C_{11} = 6.8$ ppm/° C.
$C_{21} = -30.7$ ppb/° C.$^2$
$C_{12} = 0.4$ ppm/° C.
$C_{22} = -38.1$ ppb/° C.$^2$ $f_{01} \sim 433.6$ MHz
$\Delta f_{01} \approx \Delta f_{02} = 3 \cdot \sigma(f_{01}) = 110$ kHz
$\Delta(C_{12}-C_{11}) = 3 \cdot \sigma(C_{12}-C_{11}) = 0.456$ ppm/° C.
$\Delta(C_{22}-C_{21}) = 3 \cdot \sigma(C_{22}-C_{21}) = 0.41$ ppb/° C.²
Hence:

$$\Delta s = \Delta f_{01} \cdot |C_{12} - C_{11}| + f_{01} \cdot \Delta(C_{12} - C_{11})$$
$$= 110 * 10^3 * 6.4 * 10^{-6} + 433.6 * 10^6 * 0.456 * 10^{-6}$$
$$= 0.704 + 197.7216$$

It is thus seen that $\Delta f_{01} \cdot |C_{12}-C_{11}| \ll f_{01} \cdot \Delta(C_{12}-C_{11})$
It is therefore possible to make the approximation $\Delta s \approx f_{01} \cdot \Delta(C_{12}-C_{11})$
Likewise:

$$\Delta \varepsilon = \Delta f_{01} \cdot |C_{22} - C_{21}| + f_{01} \cdot \Delta(C_{22} - C_{21})$$
$$= 110 * 10^3 * 7.4 * 10^{-9} + 433.6 * 10^6 * 0.41 * 10^{-9}$$
$$= 814 * 10^{-6} + 177.776 * 10^{-3}$$

It is thus seen that: $\Delta f_{01} \cdot |C_{22}-C_{21}| \ll f_{01} \cdot \Delta(C_{22}-C_{21})$
It is therefore possible to make the approximation: $\Delta \varepsilon \approx f_{01} \cdot \Delta(C_{22}-C_{21})$
Returning to the 3 differential temperature coefficients, their dispersions can therefore be written:

$-d\Delta_0 = d(f_{02}-f_{01})$ $-ds \approx f_{01} \cdot d(C_{12}-C_{11})$ $-d\varepsilon \approx f_{01} \cdot d(C_{22}-C_{21})$  (8)

This result can be extended to cuts other than those cited above since the orders of magnitude remain the same whatever the cut.

The applicant has shown that the dispersion in the sensor temperature laws depends essentially on the dispersion in the frequency difference which has formed the subject of a patent application filed by the applicant and published under the reference FR 2 907 284, and the dispersions in the differences of CTFs between the 2 resonators.

It is therefore possible to reduce the dispersion in the sensor temperature laws by carrying out a matching of the 2 resonators. That is to say by selecting from among the sets of specimens of resonators $R_1$ and $R_2$ pairs of specimens such that:

$(f_{02}-f_{01}) - \xi(f_{02}-f_{01}) < (f_{02}-f_{01}) < (f_{02}-f_{01}) + \xi(f_{02}-f_{01})$ $(C_{12}-C_{11}) - \xi(C_{12}-C_{11}) < (C_{12}-C_{11}) < (C_{12}-C_{11}) + \xi(C_{12}-C_{11})$ $(C_{22}-C_{21}) - \xi(C_{22}-C_{21}) < (C_{22}-C_{21}) < (C_{22}-C_{21}) + \xi(C_{22}-C_{21})$  (9)

With $\xi$ the permitted variation in the difference considered.
For example, for the cuts considered, it is possible to carry out a matching satisfying:

795 kHz $< (f_{02}-f_{01}) <$ 805 kHz with $\xi(f_{02}-f_{01}) = 5$ kHz $-6.45$ ppm/° C. $< (C_{12}-C_{11}) < -6.35$ ppm/° C. with $\xi(C_{12}-C_{11}) = 0.05$ ppm/° C.

7.35 ppb/° C.² $< (C_{22}-C_{21}) <$ 7.45 ppb/° C.² with $\xi(C_{22}-C_{21}) = 0.05$ ppb/° C.²

The advantage of matching is to allow much higher yields than a sorting operation on the parameters of resonators taken separately for identical temperature law dispersions.

It is thus apparent that the matching can reduce the temperature law dispersions while maintaining acceptable yields.

It is explained hereinafter how it is thus possible to carry out a matching based on the difference of CTFs without individually measuring the resonators temperature-wise, this constituting a major characteristic of the present invention.

The applicant has started from the finding that the resonators generally use points said to have insensitivity to the width of electrodes so that the resonant frequency is "almost" independent of the latter by virtue of imposed design rules. For this purpose, a point is sought for which:

$$\left. \frac{\partial f_0}{\partial a} \right|_{a=a_{nom}} = 0 \tag{10}$$

The resonant frequency of the resonator then depends only on the metallization thickness and the angle of cut $\theta$.

Moreover, it may easily be shown that the dispersions in resonant frequencies depend very significantly on the dispersions in metallization thickness h.

Figure 2:
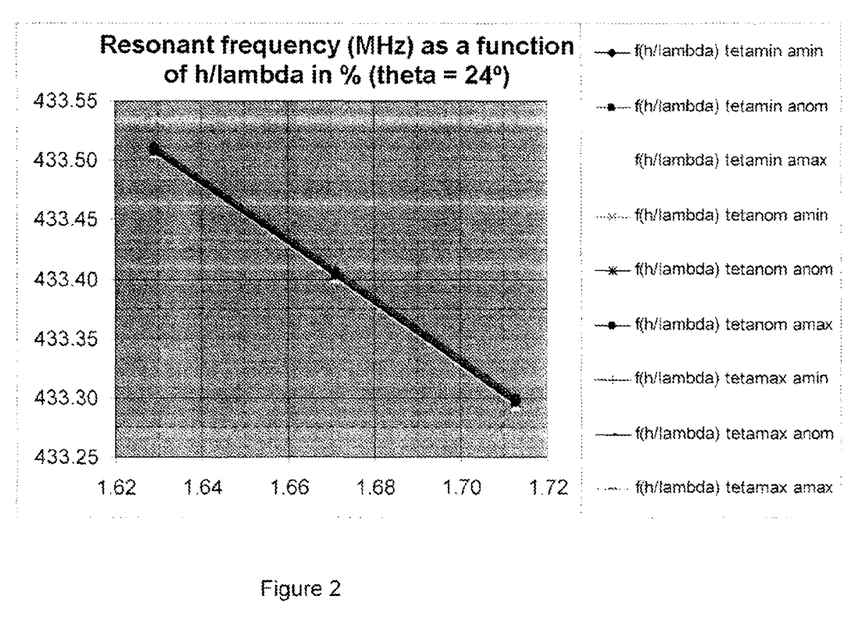
FIG. 2 illustrates the evolution of the resonant frequency (MHz) as a function of h/λ in % for an angle of cut of 24°, for various pairs (θ, a)

FIG. 2 illustrates this effect for an exemplary cut with $\theta=24°$. It is apparent that the curves corresponding to variations $\Delta\theta$ of + or $-0.05°$ around 24° all coincide for various values of a ($a_{nom}$, $a_{min}$ and $a_{max}$), the set of curves being relative to the following pairs: $(\theta_{min}, a_{min})$, $(\theta_{min}, a_{nom})$, $(\theta_{min}, a_{max})$, $(\theta_{nom}, a_{min})$, $(\theta_{nom}, a_{nom})$, $(\theta_{nom}, a_{max})$, $(\theta_{max}, a_{min})$, $(\theta_{max}, a_{nom})$, $(\theta_{max}, a_{max})$.

Figure 3:
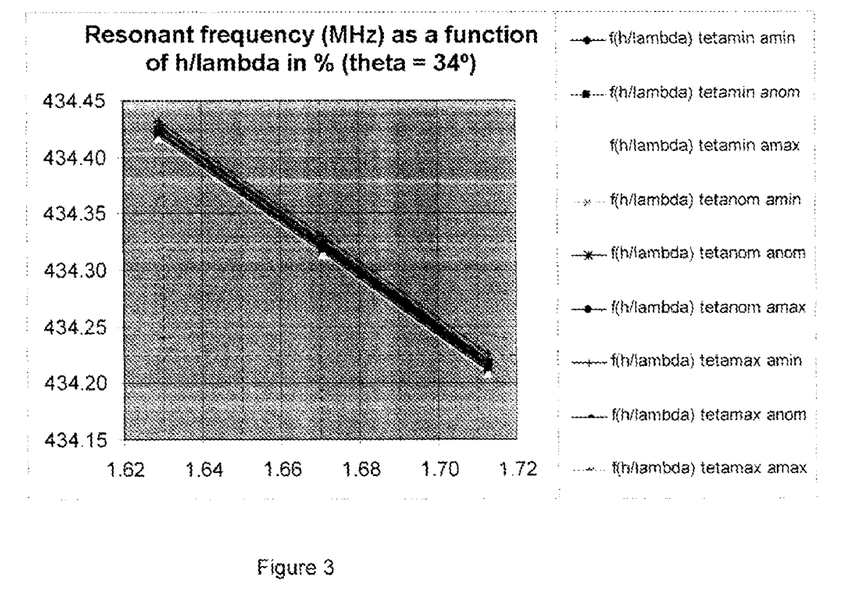
FIG. 3 illustrates the evolution of the resonant frequency (MHz) as a function of h/λ in % for an angle of cut of 34°, for various pairs (θ, a)

The same phenomenon is obtained with an angle of cut $\theta=34°$ and illustrated by FIG. 3.

It emerges from this set of curves that the resonant frequency of the resonators therefore depends essentially on the dispersions in the metallization thicknesses h.

If a sorting operation is carried out on the resonant frequencies reducing the dispersions in the latter, the dispersions in metallization thicknesses are thus very significantly reduced.

Figure 4:
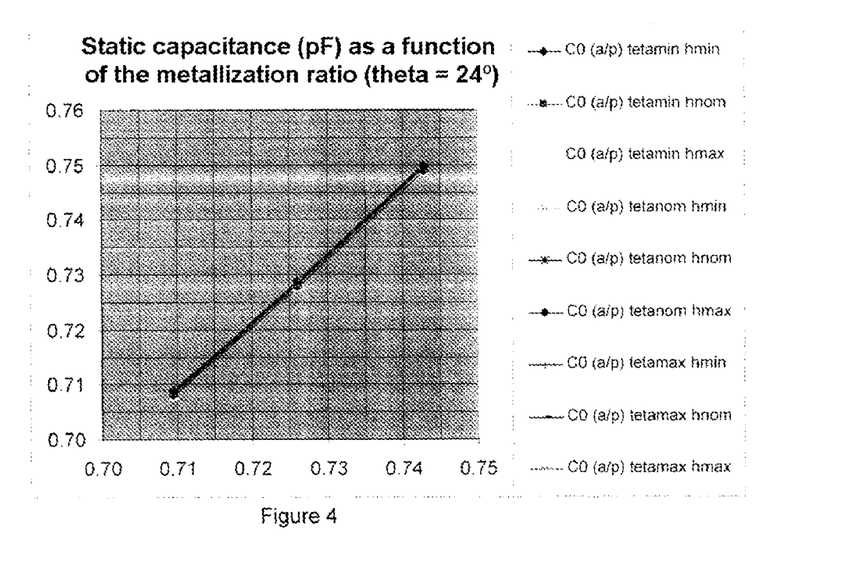
FIG. 4 illustrates the evolution of the static capacitance (pF) as a function of the metallization ratio for an angle of cut of 24°, for various pairs (θ, h)
Figure 5:
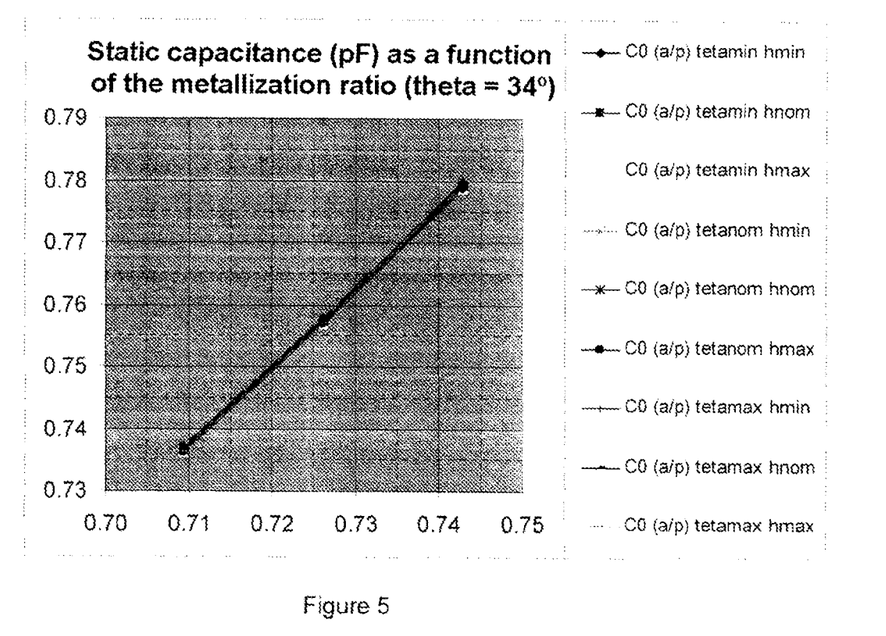
FIG. 5 illustrates the evolution of the static capacitance (pF) as a function of the metallization ratio for an angle of cut of 34°, for various pairs (θ, h)

Moreover the applicant has established that the dispersion in static capacitance value depends very significantly on the dispersion in electrode width as illustrated by FIGS. 4 and 5 relating to the evolution of the static capacitances as a function of the normalized metallization ratio a/p and those for the two angles of cut $\theta=24°$ and $\theta=34°$, the set of curves being relative $(\theta_{min}, h_{min})$, $(\theta_{min}, h_{nom})$, $(\theta_{min}, h_{max})$, $(\theta_{nom}, h_{min})$, $(\theta_{nom}, h_{nom})$, $(\theta_{nom}, h_{max})$, $(\theta_{max}, h_{min})$, $(\theta_{max}, h_{nom})$, $(\theta_{max}, h_{max})$.

In parallel, the applicant was interested in the static capacitance denoted $C_0$ corresponding to the capacitance created by the inter-digitated comb transducer and the successive electrodes subjected to differences of electrical potentials. It may be shown that the dispersions in the value of this capacitance depend significantly on the dispersions in electrode widths.

Thus, a sorting operation on the values of static capacitance aimed at reducing their dispersions very significantly reduces the dispersions in electrode widths. The static capacitance of the resonator $R_1$ is denoted $C_{01}$ and the static capacitance of the resonator $R_2$ is denoted $C_{02}$.

The principle of the present invention rests on the fact of reducing the dispersion in the difference of CTFs (1st and 2nd orders) without measuring the resonators individually temperature-wise.

It was demonstrated previously that $f_0$, $C_1$, $C_2$ depended solely on a, h, $\theta$, and that it was possible: on the one hand to reduce the dispersion in metallization thickness by carrying out a sorting operation on the resonant frequency and on the other hand to reduce the dispersion in electrode width by carrying out a sorting operation on the static capacitance of the resonators.

It is therefore possible to reduce the dispersion in CTFs without measuring the sensors temperature-wise but by carrying out a measurement of electrical parameters at ambient temperature. However, it is not desirable to carry out a sorting operation on the resonators separately but to use a matching as indicated previously so as not to penalize the yields.

An important aspect of the present invention consists therefore in carrying out a matching of $R_1$ and $R_2$ so as to reduce the dispersions in $f_{02}-f_{01}$ and $C_{02}-C_{01}$, so as ultimately to reduce the dispersions in $C_{12}-C_{11}$ and $C_{22}-C_{21}$.

A matching on $f_{02}-f_{01}$ and $C_{02}-C_{01}$ appreciably reduces the dispersions in $h_2-h_1$ and $a_2-a_1$ and the reductions in the dispersions in $h_2-h_1$ and $a_2-a_1$ obtained generate an appreciable reduction in the dispersions in $C_{12}-C_{11}$ and $C_{22}-C_{21}$.

Advantageously, the measurements of the electrical reflection coefficient S11 of the resonators are carried out with tips exhibiting a characteristic impedance of 50 ohms and connected to a network analyser. A calibration of the tips (open circuit, short-circuit, suitable load, and correction of the phase shift related to the electrical length of the measurement means) will have been carried out beforehand.

A recording of the variation of the parameter S11 in the frequency band of interest is performed. The values of the modulus and of the phase of S11 are therefore available with a frequency sampling increment small enough to correctly evaluate the resonant frequency (on the basis of the maximum of the conductance). A parameter fitting corresponding to the variation of the coefficient S11 is thereafter typically performed with respect to a model of Butterworth Van Dyck type composed of a series RLC circuit with the static capacitance of the SAW device in parallel. On completion of the fitting operation the static capacitance and the resonant frequency of the resonator at the resonant frequency are therefore known.

An alternative scheme can also be employed; the latter consists in using a high-precision (less than a femtoFarad) capacimeter.

The applicant has estimated the yields of a matching by aggregating the parameters $f_{02}-f_{01}$ and $C_{02}-C_{01}$ with the first series of resonators $R_1$ and the second series of resonators $R_2$.

The variables $f_{01}$, $f_{02}$, $C_{01}$, $C_{02}$ are considered to be Gaussian random variables. The means and the standard deviations of these variables are those arising from experimental data. It is considered for this purpose that the range is equal to 6 times the standard deviation:

$$\max(X) - \min(X) = 6 \cdot \sigma(X)$$

The standard deviations used are as follows:

$$\sigma(f_{01}) = \sigma(f_{02}) = 37 \text{ kHz}$$

$$\sigma(C_{01}) = \sigma(C_{02}) = 7 \text{ fF}$$

The algorithm used to carry out the matching does not use any optimization scheme, various pairs of specimens are not tested to maximize the number of matched specimens. The set of specimens of resonators $R_1$ is simply perused and for each of them a resonator $R_2$ is selected such that the differences $f_{02}-f_{01}$ and $C_{02}-C_{01}$ satisfy the matching criterion.

Finally, in practice, it turns out that the matching is realizable on condition that one limits oneself to a wafer of resonator $R_1$ and a wafer of resonator $R_2$ in the choice of the pairs of specimens to be matched. Now, the number of resonators that can be produced on a wafer is approximately 1200. The calculated yields therefore correspond to a matching of 1200 specimens of resonators $R_1$ and 1200 specimens of resonators $R_2$.

Table 1 below presents the values of the yields achievable as a function of the matching criterion:

| Matching criterion based on $f_{02} - f_{01}$ and $C_{02} - C_{01}$ | Matching criterion based on $f_{02} - f_{01}$ in kHz | Matching criterion based on $C_{02} - C_{01}$ in fF | Yield in % |
| --- | --- | --- | --- |
| +/- $\sigma(X)$ | +/-37 | +/-7 | 99.25 |
| +/-0.5 $\sigma(X)$ | +/-17.5 | +/-3.5 | 97.6 |
| +/-0.2 $\sigma(X)$ | +/-7.4 | +/-1.4 | 87.7 |
| +/-0.1 $\sigma(X)$ | +/-3.7 | +/-0.7 | 71.6 |
| +/-0.05 $\sigma(X)$ | +/-1.85 | +/-0.35 | 47.1 |
| +/-0.01 $\sigma(X)$ | +/-0.37 | +/-0.07 | 3.5 |
| +/-0.005 $\sigma(X)$ | +/-0.185 | +/-0.035 | 1.3 |

The two cases of matching to +/-0.2 $\sigma(X)$ and +/-0.1 $\sigma(X)$ are particularly interesting in so far as they lead to yields of respectively 87.7% and 71.6%, which are compatible with industrial objectives and impose attainable constraints in terms of dispersion.

Indeed, in each case, the dispersion in $a_2-a_1$ is calculated first of all on the basis of the dispersion in $C_{02}-C_{01}$ by considering that $C_{02}-C_{01}$ depends solely on $a_2-a_1$. The uncertainty in $f_{02}-f_{01}$ is then calculated on the basis of the calculated dispersion in $a_2-a_1$ and of the dispersion in $\theta_2-\theta_1$, and this is added to the matching criterion based on $f_{02}-f_{01}$ to get the total span of variations of $f_{02}-f_{01}$ that is attributable to $h_2-h_1$ (allowance for the case where the variations due to $h_2-h_1$ and those due to $a_2-a_1$ and $\theta_2-\theta_1$ are of opposite signs). Having calculated the total span of variations of $f_{02}-f_{01}$ that is attributable to $h_2-h_1$, the dispersion in $h_2-h_1$ is calculated. Finally, knowing the dispersions in $h_2-h_1$, $a_2-a_1$ and $\theta_2-\theta_1$, the dispersions in $C_{12}-C_{11}$ and $C_{22}-C_{21}$ are calculated.

The results associated with the 2 cases, as well as the intermediate steps, are summarized in Table 2 below.

| Matching Criterion | +/-0.2 $\sigma(X)$ (+/-7.4 kHz / +/-1.4 fF) | | +/-0.1 $\sigma(X)$ (+/-3.7 kHz / +/-0.7 fF) | |
| --- | --- | --- | --- | --- |
| $\frac{\Delta(a_2 - a_1)}{p}$ | +/-0.0018 | | +/-0.0012 | |
| Uncertainty $f_{02} - f_{01}$ due to $\Delta(\theta_2 - \theta_1)$ | +/-5.5 kHz | | +/-5.5 kHz | |
| Uncertainty $f_{02} - f_{01}$ due to $\Delta(a_2 - a_1)$ | +/-1.25 kHz | | +/-1.15 kHz | |
| Total Uncertainty | +/-14.15 kHz | | +/-10.35 kHz | |
| $\frac{\Delta(h_2 - h_1)}{p}$ | +/-0.0068% | | +/- 0.0054% | |
| Order of Differential Temperature Coefficiencs | $C_1$ | $C_2$ | $C_1$ | $C_2$ |
| $\Delta(C_2 - C_1)$ due to $\Delta(h_2 - h_1)$ | +/-0.0305 ppm/° C. | +/-0.035 ppb/° $C^2$. | +/-0.0285 ppm/° C. | +/-0.0305 ppb/° $C^2$. |
| $\Delta(C_2 - C_1)$ due to $\Delta(a_2 - a_1)$ | +/-0.0315 ppm/° C. | +/-0.0315 ppb/° $C^2$. | +/-0.027 ppm/° C. | +/-0.0305 ppb/° $C^2$. |
| $\Delta(C_2 - C_1)$ due to $\Delta(\theta_2 - \theta_1)$ | +/-0.045 ppm/° C. | +/-0.053 ppb/° $C^2$. | +/-0.045 ppm/° C. | +/-0.053 ppb/° $C^2$. |
| Sum of Differential Coefficients Dispersions | +/-0.107 ppm/° C. | +/-0.12 ppb/° $C^2$. | +/-0.101 ppm/° C. | +/-0.114 ppb/° $C^2$. |

On the basis of the previously calculated dispersions (last line of table 2), it is possible to determine the reduction in the error in the measurement of the temperature obtained.

For this purpose, first of all the mean calibration coefficients are calculated on the basis of the mean parameters ($f_0$, $C_1$, $C_2$) obtained by simulation for each resonator.

Next, random draws are carried out on the basis of the dispersions obtained.

For $f_{02}-f_{01}$, a uniform distribution in $[-\Delta(f_{02}-f_{01}), \Delta(f_{02}-f_{01})]$ is used since $f_{02}-f_{01}$ is matched directly and since the matching criterion is small compared with the range of the initial Gaussian. For $C_{12}-C_{11}$ and $C_{22}-C_{21}$, a Gaussian distribution is used based on the dispersions calculated previously ($\Delta(X)=3\cdot\sigma(X)$). More precisely, we calculate:

$$3\cdot\sigma(s)=\Delta s \approx f_{01}\cdot\Delta(C_{12}-C_{11})$$

$$3\cdot\sigma(\epsilon)=\Delta\epsilon \approx f_{01}\cdot\Delta(C_{22}-C_{21})$$

Next, Gaussian random draws of s with standard deviation $\sigma(s)$ and of $\epsilon$ with standard deviation $\sigma(\epsilon)$ are carried out.

The parameters (mean values) used are as follows:
$E[C_{11}]$=6.8 ppm/° C.
$E[C_{21}]$=−30.7 ppb/° C.$^2$
$E[C_{12}]$=0.4 ppm/° C.
$E[C_{22}]$=−38.1 ppb/° C.$^2$
$E[f_{01}]$~433.4 MHz
$E[f_{02}]$~434.5 MHz The temperature span considered by way of example is defined by T$\epsilon$[−20, 250]° C.

1) For a matching to +/−0.2 $\sigma(X)$:

$$\Delta(f_{02}-f_{01})=7.4 \text{ kHz}$$

$$\sigma(s)=0.036 \text{ ppm/° C.}*433.4 \text{ MHz}=15.6 \text{ Hz/C}$$

$$\sigma(\epsilon)=0.04 \text{ ppb/° C.}^2*433.4 \text{ MHz}=0.0173 \text{ Hz/C}^2$$

We obtain:

$$3\cdot\sigma(Err)=5.75° \text{ C. and } 99.74\% \text{ of the population in the interval } [-3.62,3.62]° \text{ C.}$$

2) For a matching to +/−0.1 $\sigma(X)$ $$\Delta(f_{02}-f_{01})=3.7 \text{ kHz}$$

$$\sigma(s)=0.034 \text{ ppm/° C.}*433.4 \text{ MHz}=14.735 \text{ Hz/C}$$

$$\sigma(\epsilon)=0.038 \text{ ppb/° C.}^2*433.4 \text{ MHz}=0.0165 \text{ Hz/C}^2$$

We obtain:

$$3\cdot\sigma(Err)=3.55° \text{ C. and } 99.74\% \text{ of the population in the interval } [-2.81,2.81]° \text{ C.}$$

Figure 6:
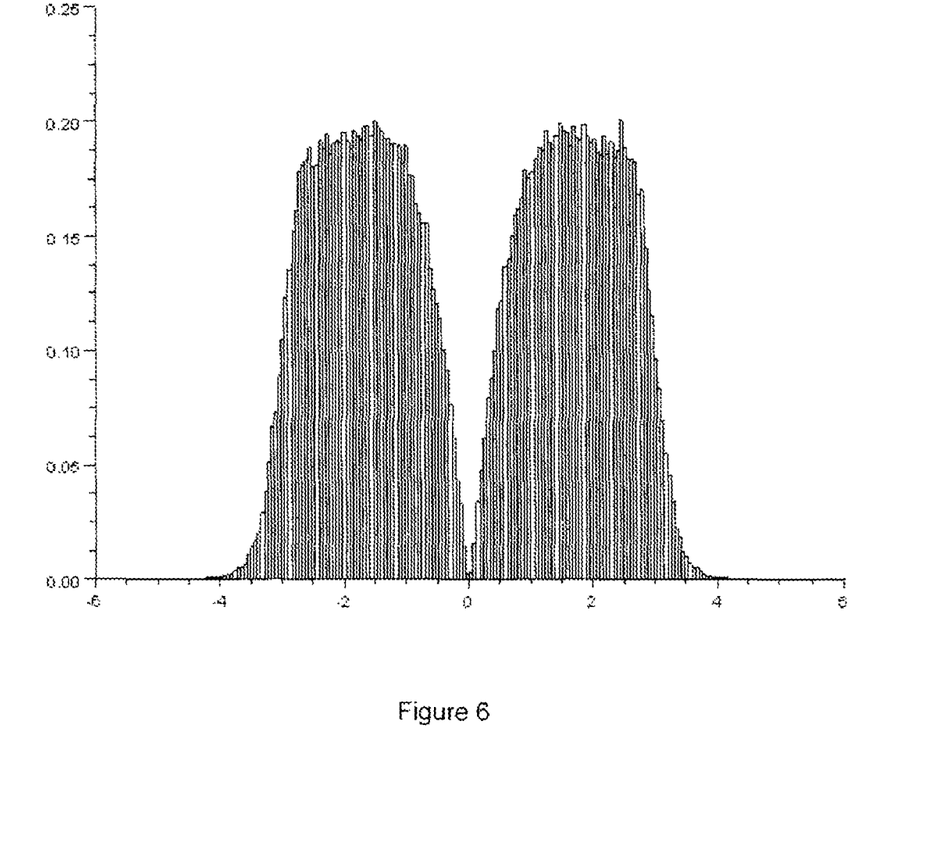
FIG. 6 illustrates the error probability density obtained during a matching operation with a criterion +/−0.2 σ(X) used in a method of collective fabrication according to an embodiment of the present invention.
Figure 7:
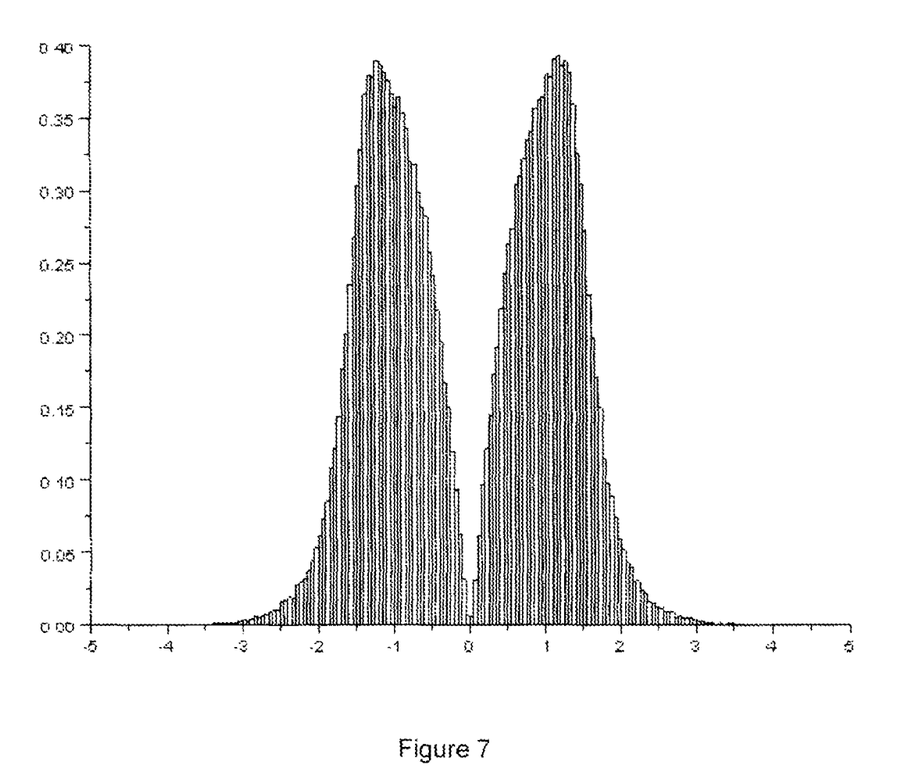
FIG. 7 the error probability density obtained during a matching operation with a criterion +/−0.1 σ(X) used in a method of collective fabrication according to an embodiment of the present invention.

FIGS. 6 and 7 show that a matching operation for the criterion +/−0.2 $\sigma(X)$ leads to the obtaining of a calibration-free temperature sensor operating in the span −20° C. to 250° C. exhibiting a precision of +/−3.6° C. throughout the span with a matching yield of 87.7% and that a matching operation for the criterion +/−0.1$\sigma(X)$ generates a decrease in the yield (71.6%) but makes it possible to obtain a calibration-free sensor with a better precision (+/−2.8° C.) in the same temperature span.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A method of collective fabrication of remotely interrogatable sensors, each sensor includes at least one first resonator and at least one second resonator, each of the at least one resonator includes acoustic wave transducers that exhibit a first and a second operating frequency, the method comprising:
fabricating a first series of the at least one first resonators exhibiting a first resonant frequency at ambient temperature and a first static capacitance;
fabricating a second series of the at least one second resonators exhibiting a second resonant frequency at ambient temperature and a second static capacitance;
performing a series of electrical measurements of the first series of the at least one first resonators and the second series of the at least one second resonators to determine first pairs and second pairs of resonant frequency and of capacitance of each of the at least one first resonators and the at least one second resonators; and
performing a series of matching of a first resonator and of a second resonator based at least in part on the aggregate of two criteria:
(a). a dispersion in a difference in resonant frequency of each of the at least one first resonators and the at least one second resonators is less than a first threshold value; and
(b) a dispersion in a difference in capacitance of each of the at least one first resonators and the at least one second resonators is less than a second threshold value.

2. The method according to claim 1, wherein the series of electrical measurements are performed by measurement of a reflection coefficient S11 or measurement of an admittance Y11 or measurement of an impedance Z11.

3. The method according to claim 1, wherein the series of electrical measurements are performed with a network analyzer.

4. The method according to claim 1, wherein the series of electrical measurements of capacitance are performed with a capacimeter.

5. The method according to claim 1, wherein the first pairs and the second pairs of the resonant frequencies are similar and situated in ISM frequency span from 433.05 MHz to 434.79 MHz, and the first threshold value is less than or equal to about a kiloHertz.

6. The method according to claim 1, wherein the first pairs and the second pairs of the resonant frequencies are similar and situated in the ISM frequency span from 433.05 MHz to 434.79 MHz, and the second threshold value is less than a femtoFarads.

7. The method according to claim 1, wherein for each of the first resonator of the first series of the at least one first resonators and a selection of a second resonator of the second series of the at least one second resonators satisfies the two criteria.

8. The method according to claim 1, wherein the first series of the at least one first resonators are fabricated on a first substrate and the second series of the at least one second resonators are fabricated on a second substrate.

9. The method according to claim 1, wherein the first series of the at least one first resonators and the second series of the at least one second resonators are produced on first and second quartz substrates of different cuts.

10. The method according to claim 9, wherein the first and second quartz substrates are defined by angles of cut Θ, of 24° and 34° in order to generate frequencies of 433 MHz and 434 MHz.

11. The method according to claim 1, further comprising:
fabricating the first series of the at least one first resonators on a first substrate and fabricating the second series of the at least one second resonators on a second substrate;
performing unit slicing of first and of second chips including the first series of the at least one first resonators and the second series of the at least one second resonators, respectively, from the first and second substrates;
matching the first and second chips; and
assembling of the first and second chips in a package.

12. The method according to claim 1, further comprising:
fabricating the first series of the at least one first resonators on a first substrate and fabricating the second series of the at least one second resonators on a second substrate;
performing unit slicing of first and of second chips including the first series of the at least one first resonators and the second series of the at least one second resonators, respectively, from the first and second substrates;
performing an individual packaging of the first and second chips in individual packages;
matching a first and of a second chips from a previously package.

13. The method according to claim 1, wherein the sensor is a temperature sensor.

14. The method according to claim 1, wherein the first series of the at least one first resonators are oriented on a first substrate in a first direction, the second series of the at least one second resonators are oriented on a second substrate in a second direction, the first and second directions corresponding to directions of propagation of surface waves, and the first direction makes a non-zero angle with the second direction.

* * * * *